United States Patent Office 2,862,933
Patented Dec. 2, 1958

2,862,933
PROCESS OF PREPARING CHOLENIC ACID DERIVATIVES

Wolter Smit and Pieter Modderman, Oss, Netherlands, assignors to Organon Inc., Orange, N. J., a corporation of New Jersey No Drawing. Application February 27, 1957
Serial No. 642,644

Claims priority, application Netherlands March 2, 1956

4 Claims. (Cl. 260—397.1)

The present invention relates to the preparation of compounds selected from the group consisting of $\Delta^{9(11)}$-3α,12-dihydroxy-cholenic acid and functional derivatives thereof, which compounds are intermediates in the synthesis of adrenocortical hormones from bile acids.

It is known that the hydrogenation of $\Delta^{9(11)}$-3α-hydroxy-12-oxo cholenic acid and the functional derivatives thereof, can be carried out with hydrogen in the presence of platinum as a catalyst.

Now it was found that the yield of this reduction step can be improved by carrying out the reduction by means of an alkali metal borohydride. In addition this method has the advantage that side reactions, which may occur in the known method with platinum as a catalyst and in which the hydroxyl group formed in 12-position may be split off do not occur here.

As reagents potassium, sodium, or lithiumborohydride may be applied.

The present reaction may be carried out in an aqueous medium, in which case the substance is brought to solution as a salt, e. g. as an alkali metal salt, or in an organic solvent, such as a lower aliphatic alcohol, e. g. methanol, ethanol, isopropanol, and a butanol, or in a mixture of solvents. Preferably methanol is used.

In this reaction both the free $\Delta^{9(11)}$-3α-hydroxy-12-oxo-cholenic acid and functional derivatives thereof may be used as starting products.

By a functional derivative of this compound is understood an alkyl ester thereof, such as the lower alkyl esters methyl, ethyl, propyl, and pentyl ester, which may be esterified in the 3α-position by an aliphatic, aromatic, or araliphatic carboxylic acid, such as formic acid, acetic acid, succinic acid, benzoic acid, and β-phenylpropionic acid.

The reaction may take place at temperatures between about 0 and 55° C. Preferably a temperature of 40° C. is applied in this hydrogenation.

It has appeared of advantage to use in this reduction about 1½ mol of the reagent to 1 mol of starting substance.

After completion of the reaction the $\Delta^{9(11)}$-3α,12-dihydroxy-cholenic acid or a functional derivative thereof can be isolated from the reaction mixture nearly quantitatively, see example I. As intermediate products for the further synthesis of adrenocortical hormones they usually are not separated from the reaction mixture, however, but directly converted into the methyl-$\Delta^{11}$-3α,9α-epoxy-cholenate which is brominated to the corresponding, 11,12-dibromocompound, which is obtained in the form of two stereo-isomers, viz. the 11β,12α-dibromocompound melting at 143° C. and the 11α,12β-dibromocompound melting at 123° C.

The total yield of the said dibromides, calculated on the starting product of this reaction series, amounts to 115 to 120%, whereas according to the known method of hydrogenating a yield of about 105% can be obtained. The high-melting dibromide is applied for further synthesis; the low-melting isomer can be converted into the high-melting form.

EXAMPLE I
$\Delta^{9(11)}$-3α,12-dihydroxycholenic acid

In 500 ml. of distilled water, in which 11.5 g. of sodium hydroxide have been dissolved, 100 g. of $\Delta^{9(11)}$-3α-hydroxy-12-oxo-cholenic acid are brought at room temperature, while stirring. 15 g. of sodium borohydride are added. After stirring for about 20 minutes a voluminous precipitate is formed which disappears again. After 1 hour the temperature of the solution is raised to 40° C. After 12 hours the reduction is completed. The reaction mixture is added dropwise to a solution of 20 ml. of concentrated sulphuric acid in 500 ml. of water while stirring.

The resulting, precipitated $\Delta^{9(11)}$-3α,12-dihydroxy-cholenic acid is filtered by suction and washed with water. After drying 99 g. of a product are obtained which represent a mixture of $\Delta^{9(11)}$-3α,12α-dihydroxy-cholenic acid and of the corresponding 3α,12β-dihydroxy compound which are both considered for further processing.

EXAMPLE II 8.2 g. of potassium borohydride are added, while stirring, to a solution of 50 g. of methyl-$\Delta^{9(11)}$-3α-benzyloxy-12-oxo-cholenate in mixture of 250 ml. of ethanol and 150 ml. of water. The mixture is heated to 35° C. and stirred at this temperature for 10 hours. Subsequently the reaction mixture is evaporated to nearly dry, after which the residue is dissolved, while heating, in 250 ml. of petroleum ether. After cooling this ethereal solution, the methyl ester of the $\Delta^{9(11)}$-3α-benzyloxy-12-hydroxy-cholenic acid crystallizes, which compound is then separated.

In the same manner other functional derivatives of the $\Delta^{9(11)}$-3α-hydroxy-12-oxo-cholenic acid are reduced, such as the methyl-$\Delta^{9(11)}$-3α-acetoxy-12-oxo-cholenate; the ethyl-$\Delta^{9(11)}$-3α-benzoxy-12-oxo-cholenate; the ethyl-$\Delta^{9(11)}$-3α-succinyloxy-12-oxo-cholenate, and the propyl-$\Delta^{9(11)}$-3α-propionoxy-12-oxo-cholenate, as a result of which the corresponding 12-hydroxy compounds are formed.

EXAMPLE III
Methyl-$\Delta^{9(11)}$-3α,12-dihydroxycholenate 100 g. of $\Delta^{9(11)}$-3α-hydroxy-12-oxo-cholenic acid are dissolved in 600 ml. of methanol, after which a solution of 11.5 g. of sodium hydroxide in 15 ml. of water and 85 ml. of methanol are added. Then 10 g. of sodium borohydride are added while stirring. The mixture is brought to 40° C. and stirred at this temperature for 4 hours.

The formed $\Delta^{9(11)}$-3α-12-dihydroxy-cholenic acid is directly processed further to the methyl-$\Delta^{9(11)}$-3α-hydroxy-12-methoxycholenate. For that purpose 45 ml. of concentrated sulphuric acid in 100 ml. of methanol are added dropwise to the resulting solution, while stirring. The formed suspension is heated at 40-45° C. for 4 hours. To neutralize the sulphuric acid subsequently 140 g. of sodium acetate 3 aq. are added. Subsequently the mixture is diluted with 5 l. of water and the methyl-$\Delta^{9(11)}$-3α-hydroxy-12-methoxy-cholenate is extracted with chloroform. The extract is evaporated to a volume of 400 ml.

Methyl-$\Delta^{11}$-3α,9α-epoxycholenate

The chloroform solution of the methyl-$\Delta^{9(11)}$-3α-hydroxy-12-methoxy-cholenate is stirred with 300 ml. of concentrated hydrochloric acid at −10° C. for 4 hours. The methyl-$\Delta^{9(11)}$-3α-hydroxy-12-chloro-cholenate is formed. Subsequently the chloroform layer is separated.

The hydrochloric acid layer is washed with some chloroform. The collected chloroform solutions are washed successively with water and with a saturated sodium bicarbonate solution. Then the chloroform extract is stirred with a solution of 50 g. of sodium bicarbonate in 400 ml. of water at room temperature for 16 hours. Here the re-arrangement takes place to the methyl-$\Delta^{11}$-3α,9α-epoxy-cholenate. The chloroform layer is separated and the sodium-bicarbonate solution is washed with chloroform. After washing with water the collected chloroform layers are evaporated to 240 ml.

*Methyl-3α,9α-epoxy-11,12-dibromocholanate*

25 ml. of bromine are dissolved, while stirring, in 1 l. of dry chloroform which had been cooled to −30° C. The solution is further cooled to −60° C. To this is added, while stirring, the chloroform solution of the methyl-$\Delta^{11}$-3α,9α-epoxy-cholenate likewise cooled to −60° C. The mixture is stirred for 90 minutes, after which it is poured into a solution of 45 g. of sodium bicarbonate and 45 g. of sodium sulphite in 1.250 ml. of water. After discolouring the chloroform layer, the latter is separated and washed with water till neutral reaction. After drying and evaporating the chloroform solution to 180 ml. 620 ml. of methanol are added, while stirring, in which crystallisation of the desired final product takes place. Obtained is a first crystallisate of about 86 g. with a m. p. of 142 to 143° C. In addition about 34 g. of the low-melting dibromide are obtained from the mother-liquor.

Consequently, the yield calculated on the $\Delta^{9(11)}$-3α-hydroxy-12-oxo-cholenic acid amounts to about 120% by weight.

What we claim is:

1. A method of preparing compounds selected from the group consisting of $\Delta^{9(11)}$-3α,12-dihydroxy-cholenic acid, lower alkyl esters and esterified 3α-hydroxy derivatives thereof, which comprises reducing a compound selected from the group consisting of $\Delta^{9(11)}$-3α-hydroxy-12-oxo-cholenic acid, lower alkyl esters and esterified 3α-hydroxy derivatives thereof with an alkali metal borohydride.

2. A method of preparing compounds selected from the group consisting of $\Delta^{9(11)}$-3α,12-dihydroxy-cholenic acid, lower alkyl esters and esterified 3α-hydroxy derivatives thereof, which comprises, reducing a compound selected from the group consisting of $\Delta^{9(11)}$-3α-hydroxy-12-oxo-cholenic acid, lower alkyl esters and esterified 3α-hydroxy derivatives thereof with an alkali metal borohydride in methanol as solvent.

3. A method of preparing compounds selected from the group consisting of $\Delta^{9(11)}$-3α,12-dihydroxy-cholenic acid, lower alkyl esters and esterified 3α-hydroxy derivatives thereof, which comprises, reducing a compound selected from the group consisting of $\Delta^{9(11)}$-3α-hydroxy-12-oxo-cholenic acid, lower alkyl esters and esterified 3α-hydroxy derivatives thereof with an alkali metal borohydride at a temperature of about 40° C.

4. A method of preparing compounds selected from the group consisting of $\Delta^{9(11)}$-3α,12-dihydroxy-cholenic acid, lower alkyl esters and esterified 3α-hydroxy derivatives thereof, which comprises, reducing a compound selected from the group, consisting of $\Delta^{9(11)}$-3α-hydroxy-12-oxo-cholenic acid, lower alkyl esters and esterified 3α-hydroxy derivatives thereof with about 1.5 mols of an alkali metal borohydride to each mol of the starting substance.

References Cited in the file of this patent

UNITED STATES PATENTS

| | | |
|---|---|---|
| 2,538,109 | Lawhead et al. | Jan. 16, 1951 |
| 2,669,571 | Clayton et al. | Feb. 16, 1954 |
| 2,752,338 | Herr et al. | June 26, 1956 |

OTHER REFERENCES

Shoppe et al.: Chem. & Ind. (1954), 311.
Zorbach: J. A. C. S. 75, 6344–5 (1953).